United States Patent Office 3,516,933
Patented June 23, 1970

3,516,933
SURFACE-MODIFIED METALS IN
COMPOSITES AND BEARINGS
George Inglis Andrews, Richmond, and Aleksander Jerzy Groszek and Rodney Ernest Witheridge, London, England, assignors to The British Petroleum Company Limited, London, England, a corporation of England
No Drawing. Filed Mar. 28, 1968, Ser. No. 717,032
Claims priority, application Great Britain, Apr. 5, 1967, 15,535/67
Int. Cl. C10m 5/02, 5/22, 5/24
U.S. Cl. 252—12
1 Claim

ABSTRACT OF THE DISCLOSURE

Composites which are made from a metal, solid lubricant or a polymeric matrix, especially PTFE, and which contain also an ultra-fine metal prepared by grinding a metal in an organic liquid in the presence of load-carrying additive or fatty acid or ester are harder and wear better than corresponding composites containing ordinary metal powder.

This invention relates to improved lubricating compositions; in particular it relates to composites having a metal, solid lubricant or solid polymeric matrix in which is incorporated surface-modified, ultrafine metal flakes, and to bearings made from such composites.

It is known that certain metals can be incorporated into solid polymeric materials to form what may be termed a "composite." These composites have self-lubricating properties and can be fashioned into bearings.

In fact a considerable number of the metallic elements, and their alloys, has been used to form such composites. The polymeric materials used have been equally varied, though it has been preferred to use a solid polymeric material which has some self-lubricating capacity.

Examples of metals which have been used are: copper, silver, gold, zinc, cadmium, aluminium, indium, thallium, tin, lead, antimony, bismuth, molybdenum, tungsten and iron. Alloys which have been used include: bronze, brass, white metal and stainless steel. These metals have usually been incorporated into the solid polymeric material in the form of the powders and, less usually, as fibres.

Examples of solid polymeric materials which have been used or suggested are: polypropylenes, polyterephthalates, polyureas, polyurethanes, phenol/aldehyde resins, epoxide resins, aldehyde resins, amino-triazine resins, silicone and other rubbers and filled materials such as carbon/pitch.

In some cases a solid lubricant has also been incorporated in the composite, for example: graphite or molybdenum disulphide.

The technique used is to incorporate the metals into the solid polymeric materials which has been based on the sequence: (i) mixing (ii) compressing or shaping and (iii) sintering. If the composite is to be used as a bearing then final finishing steps may be required. In some cases injection moulding is preferred to the shaping stage.

This invention provides a composite which comprises a metal, solid lubricant or solid polymeric matrix in which is incorporated at least one metal in the form of ultra-fine metal flakes having a surface area of at least 1 m.$^2$ per gram, a bulk density of less than 1 grm. per cc. and preferably a surface energy of at least 0.01 calorie per grm.

Preferably the bulk density is less than 1 grm. per cc. and the surface energy is at least 0.05 calorie per gram.

The surface energy of the metal powders can be determined using a flow microcalorimeter as described in Chemistry and Industry, Mar. 20, 1965, pp. 482–489, by measuring the heat of reaction of n-butanol with the metal flakes.

Suitable metal flakes can be prepared by grinding a metal in an organic liquid in the presence of an organic load-carrying additive.

Suitable organic grinding fluids are those liquids which distil below 500° C. have a viscosity below 600 centistokes at 100° F. and have a viscosity of below 72 dyes/cm. at 25° C. and preferably have a viscosity of 10 to 40 dynes/cm. at 25° C. In a preferred embodiment of the invention the grinding fluid is a hydrocarbon, especially for example, n-heptane, iso-octane, cyclohexane, toluene, hexadecane or a hydrocarbon fraction obtained by the distillation of petroleum.

Organic load-carrying additives are very well known and are extensively used in lubricating compositions. Their function is to improve the anti-wear properties and/or the extreme pressure properties of the lubricating compositions. When two lubricated moving surfaces are lightly loaded against each other, they are separated by an elasto-hydrodynamic oil film; as the load increases so the oil film thickness decreases. When the oil film thickness approaches the dimensions of the surface roughness, it will be penetrated by surface asperities; it is in this region that anti-wear additives function by improving the oil film strength and thus reducing intermetallic contact. As the load is increased further, the bulk oil film collapses and anti-wear additives are no longer sufficient to protect the surface. Extreme pressure additives function in this region by reacting with the metal surfaces to form an inorganic iron compound which prevents the welding of the metal surfaces.

The term load-carrying additives includes both anti-wear and extreme pressure additives.

The load-carrying additives which can be used are those which contain one or more of the following elements: chlorine, sulphur, phosphorus and nitrogen.

Examples of suitable load-carrying additives are organic chlorine-containing compounds such as the low-molecular weight chlorinated hydrocarbons, preferably those containing from 1–4 carbon atoms e.g. carbon tetrachloride; chlorbenzyl esters of alkyl xanthic acids and of thioacids such as thiocarbonic acid; and chlorinated hydrocarbon waxes.

Other suitable load-carrying additives are the covalent sulphur-containing compounds such as the di-phenol polysulphides, e.g. di-(4-hydroxy phenol) polysulphide; alkyl and aryl thioethers; alkyl and aryl thiocarbonates and thiocarbamates; sulphur substituted carboxylic acid esters e.g. acetic esters substituted in the α-position by sulphur; sulphurised polymers, e.g. sulphurised butadiene-1,3/styrene copolymer; the reaction product of sulphur and polyalkylene glycols; alkyl disulphides e.g. di-n-butyl disulphide and di-(2-ethyl hexyl) disulphide; and di-aryl disulphides e.g. di-benzyl disulphide and di-(amino benzyl) disulphide.

Further suitable load-carrying additives are the phosphosulphurized organic compounds typical organic materials which can be phosphosulphurized include oxygen containing waxes; chlorinated phenols; waxy esters; cyclic ketones; hydrogenated sperm oil; esters of unsaturated acids, e.g. glycol and glyceryl oleates; and abietic esters.

Yet further suitable load-carrying additives are organic compounds containing phosphate or thiophosphate groups such as tri-aromatic phosphates e.g. tri-cresyl phosphate; trialkyl phosphates such as tributyl phosphate; and metal dialkyl dithiophosphates such as the zinc dialkyl dithiophosphates.

Organo metallic compounds such as organo-tin dithiophosphates and lead naphthenate can be also used as load-carrying additives.

Compounds containing nitrogen which can be used include phosphoramidates; nitrogenzenes; nitronaphthalenes; amine phosphates; tetra alkyl ammonium phosphates and thiphosphates; and rhodanine and rhodanine derivatives.

Suitable metal flakes can also be prepared by grinding a metal in an organic liquid in a vibratory mill with an amplitude of vibration of at least 2 mm. and a frequency of vibration of at least 1,000 vibrations per minute in the presence of an organic grinding aid.

Sutiable grinding aids are the fatty acids, their esters and fatty alcohols, particularly suitable grinding aids are palmitic, steanric and oleic acids, their vinyl esters, and cetyl alcohol.

Any metal or alloy which can be ground can be used to prepare the ultra-fine metal flakes used in the present invention, the preferred metals being copper and copper alloys such as brass, and iron including mild steel and cast iron. Other suitable metals are the transition metals such as nickel, cobalt, chromium and titanium.

The ultra-fine metals can be incorporated in any suitable metal, solid lubricant or polymer matrix. When a metal based composite is to be formed then the ultra-fine metal flakes should preferably be dispersed with the base metal in powder form and the mixture sintered.

Suitable solid lubricants include graphite and molybdenum disulphide.

Any plastic capable of having the ultra-fine metals dispersed therein is suitable, and the ones referred to above may be used. When the composite is to be used as a bearing the preferred polymer matrix is polytetrafluoroethylene (PTFE).

The amount of the ultra-fine metals incorporated in the metal, solid lubricant or polymer matrix maybe as low as 0.1 or as high as 99%, but is preferably from 1–80% based on the total weight of the composite.

The surface-modified, ultrafine metal flakes may be incorporated into the metal, solid lubricant or solid polymeric matrix by any suitable method. However, they are preferably incorporated into the matrix by the mechanical mixing of either wet or dry powders of the metals, solid lubricants or solid polymeric materials with either wet or dry powders of the surface-modified ultrafine metal flakes. It is preferred to mix the powders wetted with a volatile solvent such as petroleum ether. It is convenient to use an ultrasonic vibrator or mill such as a ball mill to produce a slurry blend of the powder. The mixture may then be compressed, after removal of any solvent, and sintered at a suitable temperature, for example, above 327° C. for a composite comprising a polytetrafluoroethylene (PTFE) matrix.

When the composites are to be used as bearings it is often advantageous to incorporate a solid lubricant as well as the ultra-fine metals. Suitable solid lubricants include graphite and molybdenum disulphide, oleophilic graphite and oleophilic molybdenum disulphide are especially preferred.

Another way of improving the self-lubricating properties of the composties of the present invention is to incorporate lubricating oil into the composite. This is most easily done by dispersing oil into the mixture of powders before compression.

The ultra-fine metal flakes used in the present invention impart an enhanced resistance to wear and increase the hardeners of composites containing them. Also they can render electrically non-conductive plastics conductive, and by choice of metal powder a range of electrically conductive plastics can be produced.

In order to sinter the composites the composites are preferably heated to the required temperature, maintained at this temperature for a period sufficient to sinter the composite and cooled down very slowly. This slow cooling anneals out any major internal strain in the composites.

As there is a tendency for the metal powders to oxidise at high temperatures the sintering should preferably be carried out in an inert atmosphere e.g. nitrogen.

This invention also relates to bearings fabricated from composites which comprise a metal, solid lubricant or solid polymeric matrix containing at least one metal in the form of surface-modified ultra-fine metal flakes as defined above.

The following examples serve to illustrate the invention.

EXAMPLE 1

Brass filings were ground in n-heptane containing 1% cetyl alcohol for 4 hours in a "Megapact Mark I" vibratory ball mill. The n-heptane was removed by vigorous boiling from the slurry of surface-modified, ultra-fine metal flakes separated from the mill. The metal flakes were extracted overnight in a Soxhlet extractor using n-heptane. The amplitude of vibration was 4 mm. and the frequency 3000 cycles per minute.

A commercially available PTFE powder was passed through a 12 mesh sieve (1.405 mm.).

10 g. of the sieved surface-modified, ultrafine metal flakes and 40 g. of the sieved PTFE were placed in a 250 ml. beaker, 100 ml. of 40*60 petroleum ether was added. The resultant slurry was mixed in a high speed laboratory mixer. The petroleum ether which evaporated during stirring was replaced by constant washing of powder from the walls of the beaker.

After 10 to 15 minutes, the mixing was stopped and the petroleum ether evaporated in a stream of air. The powder was then passed through a 12 mesh sieve and dried for a further 24 hours.

After drying, the powder was again sieved through a 12 mesh sieve. 2 g. of this powder was preformed in a die at pressures ranging from 5 to 15 tons per sq. inch. The preform was then "free-sintered" to cool to room temperature and the composite removed. The product had the following properties:

Properties

The modified Rockwell hardness was 68.5 units. A similar pellet of PTFE had a hardness of 71 units.

The composite according to the invention had a high resistance to wear as measured by wear values [2].

EXAMPLES 2, 3 AND 4

20% wt. of surface-modified, ultra-fine metal flakes of aluminium, chromium and iron in PTFE, were prepared as in Example 1.

Properties

The modified Rockwell hardness were respectively 73, 57 and 79 units.

EXAMPLE 5

Various other metal flakes were produced by grinding metals in n-heptane in the presence of organic additives in a vibratory ball mill. The particulars of the unground metals are shown in Table 1a and of the ground metals in 1b.

These metal flakes were dispersed in polytetrafluoroethylene by the following method.

Powdered PTFE was added to a 40/60 petroleum ether and agitiated by an ultrasonic head partially immersed in the liquid. While under agitation the filter, which had previously undergone a similar treatment was added to the PTFE. After further agitation and remilling the mixture was allowed to settle and dry under vacuum.

The intimately mixed powders were pressed at 11 ton per sq. inch pressure into compacts 15 mm. in diameter in diameter and approximately 5 mm. thick. These compacts were very porous and possessed poor mechanical properties.

The compacts were placed in a cold oven and heated at a rate of 6° C. per minute to 370° C. This temperature was maintained for a set time and the compacts were slowly cooled down at a cooling rate of greater than 8 hours for the temperature drop from 370° C. to 40° C.

Other compacts were formed under identical conditions using commercially available powders and the results are shown in Tables 2 and 3. In these tables the ultra-fine metals are numbered as in Table 1b, the composition of $M_1$, $M_4$, $M_6$ and $M_7$ is given in Table 2a, and the nature of the powders is given in Table 1a. The composites in Table 3 were formed as in Example 5 except that the sintering took place under an atmosphere of nitrogen.

As can be seen the ultra-fine metal flakes gives rise to composites having better hardness and wear values than the composites containing commercially available powders.

TABLE 1a

Powder size and Specification

Material:
- Chromium _____ 200 mesh.
- Sponge iron _____ Swedish 200 mesh.
- Cast iron _____ 150 mesh.
- Mild steel _____ 200 mesh.
- Bronze _____ 200 mesh 90% Cu, 10% Sn.
- Brass _____ 200 mesh 84% Cu, 15% Zn, 1% Al.
- Copper _____ 100/150 mesh.

TABLE 1b

| Metal | Grinding additive | Percent wt. of additive | Grinding time, hrs. | Surface area, m.²/grm. |
|---|---|---|---|---|
| Chromium (1) | Carbon tetrachloride | 1 | 4 | 4 |
| Sponge iron (2) | do | 1 | 8 | 27 |
| Cast iron (3) | do | 1 | 8 | 60 |
| Mild steel (4) | do | 1 | 8 | 16 |
| Bronze (5) | Vinyl stearate | 0.5 | 4 | 2 |
| Brass (6) | Cetyl alcohol | 1 | 4 | 1 |
| Copper (7) | Vinyl stearate | 0.5 | 4 | 3 |

TABLE 2

| Filler | Percent wt. filler in composite | Hardness R | Wear k×10⁻¹³ | Resistance, ohm cm. |
|---|---|---|---|---|
| Chromium (1) | 40 | 76 | 7.9 | |
| Chromium powder | 40 | 66 | 14.45 | |
| Sponge iron (2) | 30 | 82 | 3.66 | |
| Sponge iron | 30 | 70 | 23.79 | |
| Cast iron (3) | 30 | 75 | 2.75 | |
| Cast iron powder | 30 | 65 | 15.16 | |
| Mild steel (4) | 30 | 80 | 3.93 | |
| Mild steel powder | 30 | 65 | 37.41 | |
| Brass (6) | 60 | 90 | 1.95 | 36 |
| Brass powder | 60 | 82 | 21.62 | |
| Copper (7) | 60 | 83 | 2.83 | 54 |
| Copper powder | 60 | 67 | 19.41 | |
| $M_1$ | 20 | 67 | | 800 |
| $M_4$ | 20 | 67 | | 120 |
| $M_6$ | 20 | 63 | 4.13 | 10 |
| $M_7$ | 20 | 63 | | |
| None | | 69 | 527.0 | ∞ |

TABLE 2a

| No. | Filler | Concentration, percent |
|---|---|---|
| $M_1$ | Sponge iron (2) | 10 |
|  | Vacuum ground graphite | 10 |
| $M_4$ | Chromium | 10 |
|  | Oleophilic graphite | 10 |
| $M_6$ | Sponge iron | 10 |
|  | Oleophilic graphite | 10 |
| $M_7$ | Sponge iron | 10 |
|  | Oleophilic MoS₂ | 10 |

TABLE 3

| Metal | Percent filler in composite | Hardness R | Wear k×10⁻¹³ | Resistance, ohm cm. |
|---|---|---|---|---|
| Brass (6) | 60 | 92 | 5.90 | 23 |
| Sponge iron (2) | 30 | 63 | 6.66 | |
| Copper (7) | 60 | 87 | 40.73 | <5 |
| Bronze (5) | 60 | 84 | 14.50 | 35 |

(1) The modified Rockwell hardness R was measured on a standard Rockwell hardness test machine except that the diamond point was replaced by a ½ inch steel ball bearing. The load applied was 31.2 kg.

(2) The wear value $k$ was measured on a pin-on-disc machine, wherein the pin was a pellet of composite sliding on a steel disc rotated at 72 cm./sec. under 3 kg. load for 60 minutes. Three edges of each pellet were examined and the result given in a mean of the three values obtained. The volume of material removed is measured.

If $w$ = volume worn in time $t$
$v$ = relative velocity
$m$ = applied load
$w = kmvt$

What we claim is:

1. A composite consisting of effective amounts of surface-modified ultra-fine metal flakes selected from metals and alloys, which metal flakes having been prepared by grinding a metal selected from metals and alloys in an organic liquid distilling below 500° C., having a viscosity below 600 centistokes at 100° F., and having a surface tension below 72 dynes/cm. at 25° C., in the presence of an organic load carrying additive, solid lubricants selected from graphite and MoS₂ uniformly dispersed in an organic polymer matrix.

References Cited

UNITED STATES PATENTS

Re. 26,088   9/1966   Rulon-Miller et al. _____ 252—12
2,400,099   5/1946   Brubaker et al. _____ 252—12
3,234,128   2/1966   McLeish et al. _____ 252—12

DANIEL E. WYMAN, Primary Examiner

I. VAUGHN, Assistant Examiner

PO-1050
(5/69)

UNITED STATES PATENT OFFICE
CERTIFICATE OF CORRECTION

Patent No. 3,516,933        Dated JUNE 23, 1970

Inventor(s) George Inglis Andrews, Aleksander Jerzy Groszek and Rodney Ernest Witheridge It is certified that error appears in the above-identified patent and that said Letters Patent are hereby corrected as shown below:

Column 2, line 8, "dyes/" should read -- dynes/ --;

Column 3, line 11, "Sutiable" should read -- Suitable --;

Column 4, line 23, "40*60" should read -- 40-60 --;

Column 4, line 63, "filter" should read -- filler --;

Column 4, line 68, cancel "in" (Second occurrence); and

Column 4, line 69, cancel "diameter".

SIGNED AND SEALED
FEB 9 1971

(SEAL)
Attest:

Edward M. Fletcher, Jr.
Attesting Officer

WILLIAM E. SCHUYLER, JR.
Commissioner of Patents